United States Patent [19]

Modugno

[11] Patent Number: 5,791,061
[45] Date of Patent: Aug. 11, 1998

[54] MARKING PLUMB BOB

[76] Inventor: Giuseppe Modugno. 44 Willow St., South Windsor, Conn. 06074

[21] Appl. No.: 629,097

[22] Filed: Apr. 8, 1996

[51] Int. Cl.[6] .................................................... G01C 15/10
[52] U.S. Cl. ............................................ 33/392; 33/666
[58] Field of Search ........................... 33/392, 18.1, 34, 33/414, 666, 670

[56] References Cited

U.S. PATENT DOCUMENTS

| | | | |
|---|---|---|---|
| 668,998 | 2/1901 | Napier | 33/392 |
| 995,872 | 6/1911 | Joice | 33/392 |
| 1,949,652 | 3/1934 | McLaws | 33/392 |
| 2,795,053 | 11/1957 | Wohlstrom | 33/392 |
| 3,113,387 | 12/1963 | Bean, Jr. | 33/392 |
| 5,157,843 | 10/1992 | Barcewski | 33/392 |
| 5,299,598 | 4/1994 | Quartana, III et al. | 137/540 |

*Primary Examiner*—Christopher W. Fulton
*Attorney, Agent, or Firm*—McCormick, Paulding & Huber

[57] ABSTRACT

A marking plumb bob having a separable two-part body assembly defining a reservoir for containing dry marking material and containing a ball check valve mechanism produces a circular ring shaped marking pattern to indicate the set position of a plumb line relative to a reference surface. A biasing spring associated with the check valve mechanism moves within the reservoir to agitate the marking material contained therein each time the ball check valve mechanism operates.

13 Claims, 1 Drawing Sheet

MARKING PLUMB BOB

BACKGROUND OF THE INVENTION

This invention relates in general to plumb bobs and deals more particularly with improvements in plumb bobs of the marking type.

A plumb bob of the type with which the present invention is concerned is adapted to be suspended from a plumb line to mark the set position of the line relative to a reference surface. Marking plumb bobs are known in the art and examples of such plumb bobs are found in U.S. Pat. Nos. 5,157,843 to Barcewski, 2,795,053 to Wohlstrom and 995,872 to Joice.

Heretofore, both dry powdered marking material and liquid marking fluid have been used with such plumb bobs. Dry marking material, such as powdered chalk, is generally favored, because it is readily available and it is less prone to leakage, which may occur if the plumb bob is roughly handled as, for example, when it is transported with other tools loosely contained within a tool box. However, there are also disadvantages associated with the use of a dry powdered marking material, such as chalk. Such material is usually deposited as a spot on the reference surface, is easily smudged, and as a result, does not accurately locate the set position of an associated plumb line. Further, such powdered material tends to cake within the bob when exposed to moisture and lacks marking durability which makes it generally unsuitable for use as a bench mark for repeated reference.

It is the general aim of the present invention to provide an improved durable low cost marking plumb bob particularly well suited to employ a dry marking material, such as powdered chalk, and which provides an improved "footprint" to facilitate more accurate marking.

SUMMARY OF THE INVENTION

In accordance with the invention, a marking plumb bob is provided, which includes a hollow generally axially symmetrical body member having axially spaced apart upper and lower ends and an interior surface defining a reservoir for containing a quantity of marking material. An inlet opening at the upper end of the body member communicates with the reservoir for the introduction of marking material into the plumb bob. The body member has a coaxial downwardly converging frustoconical bottom portion terminating at the lower end of the body member. A coaxially disposed valve seat formed on the bottom wall of the body member within the lower end portion of the body member defines a discharge opening at the lower end. The body assembly further includes a cap and retaining means for releasably securing the cap to the upper end portion of the body member to provide a closure for the material inlet opening. A spherical ball valve element disposed within the body member is moveable between open and closed positions relative to the valve seat and in closed position projects downwardly from the body member. In an open position the valve element is out of seating engagement with the valve seat and cooperates with the valve seat to define a circular ring shaped discharge opening at the lower end of the body member. A valve spring disposed within the body member extends generally throughout the axial length of the reservoir and acts between the cap and the valve element to bias the valve element toward and to its closed position. An attaching means is provided for releasably securing a line to the upper portion of the body assembly externally of and in coaxial alignment with the body member.

DETAILED DESCRIPTION OF PREFERRED EMBODIMENT

Figure 1:
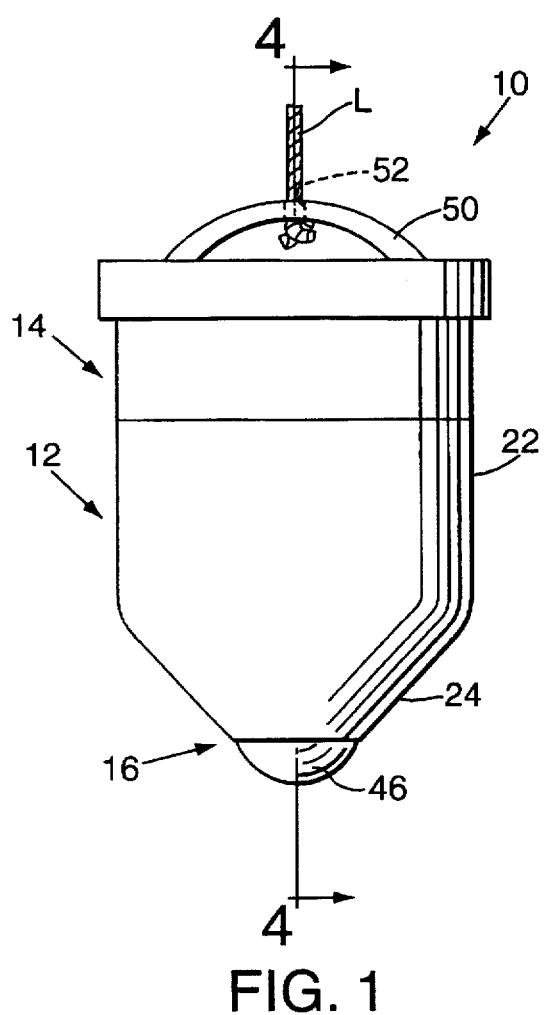
FIG. 1 is a side elevational view of a marking plumb bob embodying the present invention.
Figure 2:
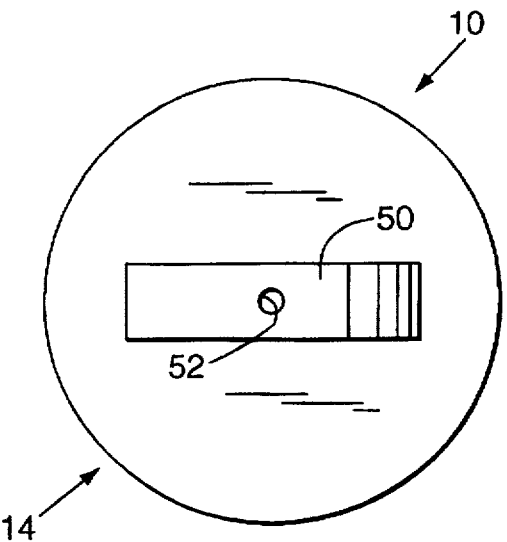
FIG. 2 is a top plan view of the plumb bob.

Turning now to the drawing and referring to FIGS. 1-4, a marking plumb bob embodying the present invention is indicated generally by the reference numeral 10. The illustrated plumb bob 10 may be made from metal or any other suitable material having sufficient weight to perform the required marking function, but preferably, and as shown, it has a body assembly made from durable plastic material and includes a hollow body member indicated generally at 12 for containing a quantity of dry marking material and a cap releasably secured to the body member and designated generally by the numeral 14 for providing a closure for an inlet opening in the body member. A ball check valve mechanism indicated generally at 16 is contained within the body assembly for releasing a dry marking material from the plumb bob 10, as will hereinafter be more fully discussed.

Figure 4:
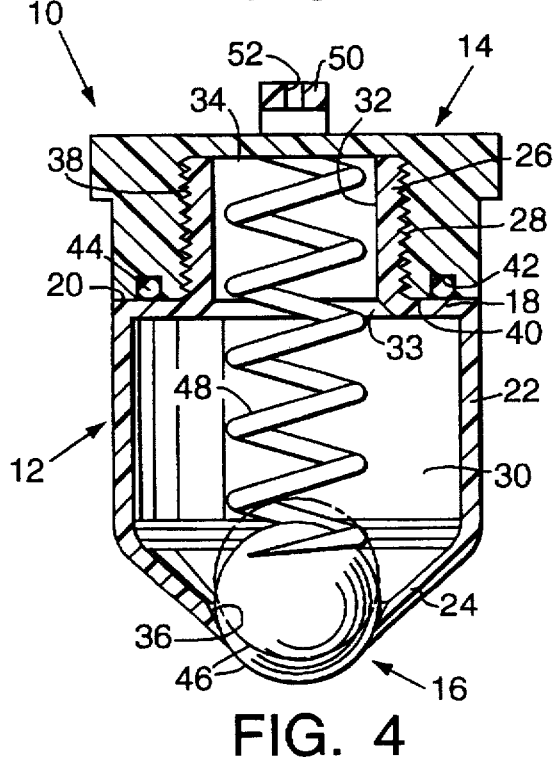
FIG. 4 is a sectional view taken along the line 4—4 of FIG. 1.
Figure 3:
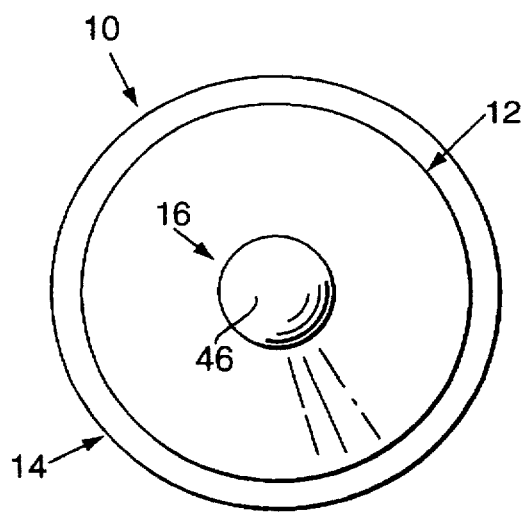
FIG. 3 is a bottom plan view of the plumb bob.

Considering now the illustrated plumb bob 10 in further detail as oriented in the drawing, and referring particularly to FIG. 4, the body member 12 comprises a hollow thin walled shell which is generally symmetrical about a vertical axis and has a radially disposed top wall 18 which includes an upwardly facing outer surface 20. The body member 12 further includes a coaxial generally cylindrical sidewall 22, which extends downwardly from the top wall 18, and a generally cylindrical frustoconical bottom wall 24, which converges downwardly from the lower end of the sidewall 22 and terminates at the lower end of the body member. A coaxial generally cylindrical neck portion 26 extends axially upward from the top wall 18, and terminates at the upper end of the body member 12, and has an external thread indicated by the numeral 28.

The interior surfaces of the top wall 18, the sidewall 22, and the bottom wall 24 cooperates to define a reservoir 30 for containing a quantity of dry marking material, as for example, powdered chalk (not shown). A coaxial bore 32 extends upwardly through the neck portion 26, communicates with the reservoir 30, and terminates at an inlet opening 34 at the upper end of the body member for the introduction of marking material into the reservoir 30. The bore 32 has a chamfer 33 at its inner end, for a purpose that will be hereinafter evident. A coaxial frustoconical valve seat 36 defined by the bottom wall 24 within the body member 12 opens through the lower end of the body member, as best shown in FIG. 4.

The cap 14 is generally cylindrical and has a downwardly open blind bore partially defined by an internal thread indicated at 38 and adapted for mating engagement with the external thread 28 to releasably secure the cap to the body member 12.

The cap has a generally radially disposed downwardly facing annular surface 40 for opposing engagement with the upwardly facing surface 20 on the body member when the cap is secured to the body member to provide a closure for the inlet opening 34. An annular grove 42 formed in the cap 14 in coaxially surrounding relation to the threaded portion 38 opens through the annular surface 40 and contains an elastomeric O-ring seal 44 which cooperates with the surface 20 when the cap 14 is secured to the body member 12 to provide a moisture resistant seal between the cap and the body member.

The check valve mechanism 16 contained within the body assembly for releasing dry marking material from the plumb bob 10 includes a valve element or spherical ball valve member 46 and a generally cylindrical coil spring 48 which acts between the ball valve member 46 and the cap 14 to bias the ball valve member into seating engagement with the valve seat 36. The upper end portion of the spring 48 cooperates with the bore 32 to retain the lower end portion of the spring in generally coaxial alignment with the valve seat 36 and the ball valve member 46 seated thereon. The ball valve member 46 is moveable relative to the body member 12 between a closed or full line position wherein it is seated on the valve seat 36 and a fully open or broken line position as shown in FIG. 4.

An appendage or strap 50 integrally connected at its opposite ends to associated peripheral portions of the cap 14 extends generally diametrically of the cap and has an upwardly bowed central portion spaced above the upper surface of the cap, as best shown in FIG. 1. A coaxially aligned aperture 52 is formed in the upwardly bowed portion of the strap 50 for receiving a knotted end of a plumb line L for attachment of the plumb line L to the plumb bob 10 to facilitate suspension of the plumb bob 10 in coaxial alignment with the line L.

As previously noted, any suitable marking material may be used with the plumb bob 10. However, colored powdered chalk is presently preferred for use as a marking material.

Figure 5:
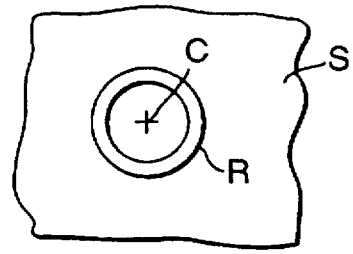
FIG. 5 is a plan view of a typical imprint produced by the plumb bob shown in FIGS. 1-4.

The ball valve member 46 is normally biased toward its full line or closed position of FIG. 4 by the valve spring 48. In the closed position the ball valve member engages the generally conical valve seat 36 along a circular line of contact. The valve mechanism is preferably arranged to deposit marking material in response to relatively light pressure applied to the ball valve member 46. The force of the spring is chosen so that the ball valve member will move upwardly within the body member 12 and to an open position, as indicated by broken lines in FIG. 4, in response to downward pressure of the plumb bob 10 against an associated surface to be marked. The spring force may be chosen so that the weight of the body assembly acting upon the spring 48 is sufficient to operate the valve mechanism 16 when the plumb bob 10 is lowered into engagement with a surface to be marked. When the plumb bob 10 is brought into marking engagement with an associated surface, such as the surface S shown in FIG. 5, the ball valve member 46 opens allowing marking material in the reservoir to pass through the generally O-shaped discharge opening formed between the ball valve member 46 and the downwardly converging valve seat 36 so that a generally circular ring of marking material indicated by the letter R is deposited on the surface S to be marked. The spherical ball member 46 and the associated valve seat 36 are preferably sized to deposit a circular ring of marking material which may range from 3/16 to 1/8 of an inch in diameter, the center C of the ring shaped "footprint" R corresponding to the set position of an associated plumb line, as shown in FIG. 5.

Preparatory to marking the set of a plumb line, the upper end of the line is secured in its set position so that the plumb bob 10 is suspended from the line immediately above a surface to be marked. The bob 10 is then lightly dropped onto or otherwise brought into engagement with the surface to be marked with sufficient applied force to operate the ball check valve mechanism 16, whereby a ring of marking material R is deposited on the surface indicating the set position of the line relative to the surface. For most purposes where a reference mark is required for only immediate usage, as, for example, in vertically aligning pipe race openings in the framing for a building, the initial O-shaped circular marking provided by the bob 10 will provide a sufficient reference. However, where a more permanent or durable reference mark is required the reference mark R may be further spotted by marking the center C of the circular "foot print" R provided by the plumb bob using a pencil or other suitable marking instrument.

The line of contact between the spherical valve member 46 and the valve seat 36 and the O-ring seal between the cap 14 and the surface 20 prevent entry of moisture into the marking material reservoir 30. Each time the plumb bob 10 operates to deposit a ring of dry marking material on an associated surface the spring 48 is compressed and moves within the reservoir 30 to provide some agitation of the dry marking material within the reservoir 30 to further prevent caking of the material within the reservoir.

The device may be easily cleaned, because the valve spring 48 and the ball check valve member 46 are immediately accessible and pass freely through the bore 32 for removal when the cap 14 is removed from the body member 12. The chamfer 33 serves to guide the spherical ball valve element 46 into the bore 32 for removal when the body member 12 is inverted.

I claim:

1. A marking plumb bob comprising a body assembly including a hollow generally axially symmetrical body member having axially spaced apart upper and lower ends and an interior surface defining a reservoir for containing a quantity of marking material and including a coaxial downwardly converging frustoconical bottom portion termination at said lower end, said body member having a material inlet opening at said upper end and a coaxially disposed valve seat within the lower end portion of said reservoir and opening through said lower end, a cap, and retaining means for releasably securing said cap to an upper end portion of said body member to provide a closure for said material inlet opening, a spherical ball disposed within said body member and moveable between closed and open positions relative to said valve seat and sealably engageable with said valve seat in said closed position, said spherical ball in said closed position projecting from said body member and having an open position wherein it is out of engagement with said valve seat, said spherical ball in an open position cooperating with said valve seat to define an annular discharge opening at said lower end, a valve spring disposed within said body member and extending generally throughout the axial length of said reservoir, said valve spring acting between said cap and said spherical ball and biasing said spherical ball toward and to said closed position, and attaching means for releasably securing a line to said body assembly externally of and in coaxially alignment with said body member.

2. A marking plumb bob as set forth in claim 1 wherein said valve seat is defined by a frustoconical downwardly converging portion of said interior surface.

3. A marking plumb bob as set forth in claim 1 wherein said body assembly is made from a non-metallic material and said spherical ball comprises a TEFLON ball.

4. A marking plumb bob as set forth in claim 1 wherein said retaining means comprises coengageable threads on said body member and said cap.

5. A marking plumb bob as set forth in claim 4 wherein said coengageable threads comprise an external thread on said body member and an internal thread on said cap.

6. A marking plumb bob as set forth in claim 5 wherein external thread is defined by a coaxial neck on said body member and said internal thread is defined by a blind bore in said cap.

7. A marking plumb bob as set forth in claim 1 wherein said inlet opening is defined by a bore in said body member communicating with said reservoir.

8. A marking plumb bob as set forth in claim 1 wherein said attaching means comprises a strap extending generally diametrically across said cap and having opposite ends integrally connected to said cap and a central portion spaced above said cap, said central portion having a coaxial cylindrical aperture therethrough for receiving the line therethrough.

9. A marking plumb bob as set forth in claim 1 including sealing means for sealing said cap to said body member.

10. A marking plumb bob as set forth in claim 9 wherein said sealing means comprises an elastomeric O-ring disposed coaxially between and in sealing engagement with said cap and said body member.

11. A marking plumb bob comprising a body assembly including a hollow body member symmetrical about a vertical axis and having a radially disposed top wall, a coaxial generally cylindrical side wall extending downwardly from said top wall, and a coaxial frustoconical bottom wall converging downwardly from the lower end of said side wall and terminating at the lower end of said body member, said top wall, said side wall, and said bottom wall having interior surfaces cooperating to define a reservoir for containing a quantity of marking material, said body member having a valve seat defined by a portion of said interior surface of said bottom wall and defining an outlet opening at said lower end and cylindrical externally threaded neck extending upwardly from said top wall and terminating at an upper end of said body member, said neck having a coaxial generally cylindrical bore extending coaxially therethrough and communicating with said reservoir, said bore defining an inlet opening at said upper end, and a cap having a downwardly open blind bore internally threaded for threadably coengagement with said externally threaded neck to releasably secure said cap to said body member and provide a closure for said inlet opening, a spherical ball valve element disposed within said body member and moveable between open and closed positions relative to said valve seat, said ball valve element in said closed position being seated on said valve seat and projecting downwardly through and beyond said outlet opening and forming a closure for said outlet opening, said ball valve element in its open position cooperating with said valve seat to define an annular discharge opening at said lower end for the release of a generally O-shaped ring of marking material onto a confronting reference surface engaged by said ball valve element, a generally cylindrical coil spring extending coaxially through said reservoir and acting between said ball valve element and said cap to bias said ball valve element toward and to said closed position, said coil spring having an upper end portion cooperating with said bore to maintain said spring in coaxial alignment with said body member, and attaching means disposed externally of said body assembly for securing a line to said plumb bob in coaxial alignment with said body member.

12. A marking plumb bob as set forth in claim 11 wherein said coil spring and said ball valve element are sized to pass freely through said bore for removal from said body member through said inlet opening when said cap is removed from said body member.

13. A marking plumb bob assembly as set forth in claim 12 wherein said attaching means comprises a strap attached to and extending diametrically across the upper end of said cap and including an upwardly bowed central position having a coaxially aligned aperture therethrough.

* * * * *